Patented Jan. 28, 1947

2,415,042

UNITED STATES PATENT OFFICE 2,415,042

BETA - SUBSTITUTED NITRILE-CELLULOSE PRODUCTS AND THE PROCESS OF MAKING SAME

John B. Rust, West Orange, N. J., assignor to Montclair Research Corporation, a corporation of New Jersey No Drawing. Application March 23, 1944, Serial No. 527,831

11 Claims. (Cl. 106—197)

The present invention relates to cellulose derivatives and to the process of making same. It is an object of this invention to provide derivatives of cellulose which are soluble in dilute alkalies.

It is a further object of this invention to make available cellulose derivatives which are useful as textile sizing compositions.

It is an object of this invention to provide wash- and laundering-fast cellulosic textile sizes.

It is a further object to provide cellulose derivatives which may be dissolved in alkali solutions and spun into fibers in a suitable precipitating bath for the production of artificial silk or precipitated in the form of film and foils. It is also an object of this invention to provide paper sizes and modifying agents.

Other objects and advantages will become apparent from the more detailed description of the invention set forth hereinafter. Such detailed description should not be construed as limiting, but only by way of explanation and illustration, since numerous variations may be made by those skilled in the art without departing from the scope and spirit of the present invention.

The derivatives of the present invention may be formed by the reaction of an alkali cellulose derivative, as for instance, soda cellulose, quaternary ammonium cellulose, potash cellulose, lithium cellulose and the like with a beta-substituted alpha-beta unsaturated nitrile. The reaction may be effected in the cold, in some instances, and in others by the application of heat.

As instances of beta-substituted nitriles which may be used in the process of the present invention, there may be mentioned crotononitrile, sorbonitrile, cinnamonitrile, and nitriles which may be produced by the reaction of aldehydes with cyanoacetic acid. Other nitriles are alpha-methyl-beta-propylacrylonitrile, beta - propylacrylonitrile, alpha-phenyl-beta - methylacrylonitrile, and the like. I may first react cellulose with sodium hydroxide, for instance, to form soda cellulose. After aging the soda cellulose to a satisfactory extent, it is mixed with cooling with the beta-substituted unsaturated nitrile. Reaction is effected either in the cold or the reaction mixture is allowed to warm up and further heating applied up to 100° C. or less. I prefer to employ nitriles which are substituted in the beta-position since such compounds are not capable usually of undergoing macropolymerization and hence are capable of reacting with alkali cellulose without undergoing side reactions leading to resinification and subsequent impoverishment of the reaction mixture of the reactant. Alpha-beta-unsaturated nitriles which are not substituted in the beta-position, such as acrylonitrile, resinify very readily under those conditions wherein they are reacted with cellulose to form reaction products which are soluble in dilute aqueous alkali solution and for this reason are not suited for use herein. Thus the nitriles of the present invention may be represented by

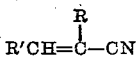

where R' and R may be alkyl, aryl, alkaryl, aralkyl, olefinyl, alkynyl and the like, or R may be hydrogen.

In the reaction of the present invention, it is suggested that the following reaction may occur. Representing cellulose as Cell—OH,

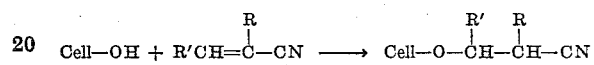

As well as the above reaction, it is suggested that some hydrolysis of the nitrile occurs due to the strongly basic environment leading to the formation of

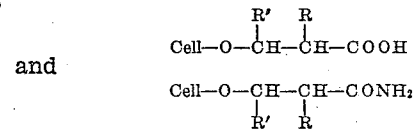

The above is given by way of possible explanation only and should not be construed as limiting since I do not wish to be limited by any theoretical explanation of the reaction of the present invention.

The cellulose derivatives are soluble in alkalies according to the number and kind of substituent groups. Thus, I may make a derivative which is insoluble in alkali at ordinary temperatures, but which is readily soluble by cooling the alkali suspension to about 0° C. Such solutions are valuable as textile sizing agents. The solutions, usually of about 1% to 10% strength, are applied to cotton, linen, etc. goods on a padder, squeezed, dried, and coagulated by using a solution of an acid, acid salt, or a precipitating concentrated salt solution. The treated textile is washed thoroughly after coagulating and then dried. A firm hand is imparted to the fabric which is resistant to laundering and the ordinary cleansing agents. The finish may be applied at practically any convenient stage of processing such as before kier boiling, before dyeing and the like.

Since the derivatives of the present invention contain cyano groups they may be caused to undergo further reaction, as for instance with aldehydes, halogen acids with alcohols to give iminoethers, and ammonia or amines to give amidines, and the like.

Thus when used as a textile sizing material, the coagulated size may be treated with formaldehyde or other aldehyde in order to effect curing and fixation of the size. Furthermore, textiles sized with the compositions of the present invention are much more receptive to dyestuffs by reason of the nitrile groups.

Cellulose in its various forms may be used in the present invention. However, after forming the alkali, or quaternary ammonium cellulose, I prefer to age it to secure some controlled degradation until the desired viscosity is obtained. The viscosity may be varied both by using different forms and sources of cellulose, by introducing more or less reactant and by degrading the cellulose to a greater or lesser degree.

In the reaction of the present invention, I may use inert diluents if desired, such as ethylene dichloride, carbon tetrachloride, benzene, ethyl ether, dioxan, heptane, and the like. When making the alkali cellulose, concentrations of from 15% to 50% of alkali may be used although greater or lesser concentrations can be employed. I usually prefer to employ concentrations of about 30% to 40%. This is also true of the quaternary ammonium hydroxides. When using these latter materials, solution of the cellulose sometimes occurs. In such cases, the solutions may be diluted with alkali metal hydroxide solutions before reaction. Such quaternary ammonium hydroxides may be trimethylbenzyl ammonium hydroxide, tetraethyl ammonium hydroxide, diethyl dipropyl ammonium hydroxide, ethyl piperidinium hydroxide, methyl pyridinium hydroxide, and the like.

The proportions of reactants may be varied within wide limits of, for instance, from 5% to about 100% of the cellulose. For several reasons it may be desirable to use an excess of beta-substituted unsaturated nitrile. For instance, in some cases a large excess of the nitrile may be used and the reaction terminated short of completion, if desired.

As well as utilizing the nitriles given above, I may also use alpha-beta unsaturated nitriles containing other negative substituents as for instance maleonitrile, citracononitrile, beta-cyano acrylic acid ester, beta-acetyl acrylonitrile, and the like. These may be represented by the general formula

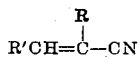

where besides being alkyl, aryl, etc., R' and R may be cyano, carboxy, keto, aldehydo, carbalkoxy, acyl and the like.

Therefore, the process of the present invention consists in allowing cellulose to react with an excess of a 15% to 50% (preferably about 30% to 40%) aqueous solution of an alkali such as sodium hydroxide to form alkali cellulose, the amount of alkali amounting to from 3 to about 8 moles per $C_6H_{10}O_5$ group of cellulose. To this mixture is then added from 5% to about 100% (based on dry cellulose) of a beta-substituted alpha-beta unsaturated nitrile as above defined and reacted for a period from 1 to about 5 hours. The reaction temperature is between ice temperature and boiling, higher temperatures being employed when a degraded product is desired; but in any case it is desirable to start the reaction at ice temperature. Afterwards the reaction mixture is acidified, whereby the product is coagulated and can be filtered, washed and dried. The dried product is capable of dissolving in dilute aqueous alkalies to form a homogeneous solution useful particularly as a wash-fast size for fabrics.

The following examples are given to illustrate the products and processes of the present invention. All proportions are in parts by weight.

*Example 1.*—77 parts of soda cellulose, containing 20 parts of cellulose and 57 parts of 30% sodium hydroxide solution, were mixed with 68 parts of a solution containing 20 parts of crotononitrile and 48 parts of pyridine. The mixture of nitrile and cellulose was homogenized and allowed to react at room temperature for 1½ hours. The product was acidified, washed with water and acetone and dried. A white powder was obtained which was soluble in 6% sodium hydroxide solution on cooling.

*Example 2.*—38.5 parts of soda cellulose, containing 10 parts of cellulose and 28.5 parts of 30% sodium hydroxide solution, were mixed with 17.1 parts of a pyridine solution of crotononitrile containing 5 parts of crotononitrile. The mixture was homogenized and heated at 50°–60° C. for 2 hours. The material was acidified with acetic acid, washed with water and acetone, and dried. The material was a white powder which was readily soluble in 10% sodium hydroxide solution on cooling.

*Example 3.*—A solution of crotononitrile-cellulose was made in water by mixing 5 parts of the crotononitrile-cellulose of Example 2 in 30 parts of 33% sodium hydroxide solution and 30 parts of water. When thoroughly mixed 40 parts of snow were added and rapid solution of the cellulose derivative was effected. The solution was used to impregnate cotton broadcloth. The excess solution was squeezed out by means of rubber rollers and the cloth dried. It was then coagulated in a 10% sulfuric acid bath, washed thoroughly with water and dried. The broadcloth possessed a firm hand which was not impaired on laundering.

*Example 4.*—66.5 parts of soda celulose, containing 15 parts of cellulose and 51.5 parts of 33% sodium hydroxide solution, were mixed with 25.8 parts of a pyridine solution containing 7.5 parts of crotononitrile. The mixture was homogenized and heated at 70° C. for 2 hours. The mixture was then acidified with 40 parts of acetic acid, washed with water and acid and dried. A white fibrous material was obtained which was soluble in dilute sodium hydroxide solutions with cooling.

*Example 5.*—35 parts of soda cellulose, containing 10 parts of cellulose and 25 parts of 33% sodium hydroxide solution, were mixed with 20.5 parts of a pyridine solution containing 5 parts of cinnamonitrile. The mixture was made homogeneous and then heated at 70° C. for 3 hours. The material was diluted with water when a solution of the cinnamonitrile cellulose occurred. The derivative was precipitated with acid, washed with water and alcohol and dried. The powder which was obtained was soluble in dilute alkali solutions at ordinary temperatures.

*Example 6.*—35 parts of soda cellulose, containing 10 parts of cellulose and 25 parts of 33% sodium hydroxide solution, were mixed with 25 parts of a pyridine solution containing 5 parts of beta propyl acrylonitrile. The mixture was stirred thoroughly until homogeneous and heated at 70° C. for 3 hours. The cellulose derivative formed a clear solution on dilution with water. It was acidified with acetic acid to form a gelatinous solution, indicating swellability in water. The material was washed and dried. The beta propyl acrylonitrile-cellulose was readily soluble in dilute alkalies to yield relatively non-viscous solution.

I claim:

1. The process of making an unsaturated nitrile-cellulose product which is soluble in dilute aqueous alkali solutions, which consists in reacting a beta-substituted alpha-beta unsaturated nitrile with alkali cellulose, coagulating the reaction mixture by acidifying it, and recovering the reaction product by filtering, washing and drying the same; the unsaturated nitrile having the formula

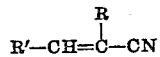

where R' is selected from the class consisting of alkyl, aryl, alkaryl, aralkyl, olefinyl, alkynyl, cyano, carboxy, keto, aldehydo, carbalkoxy and acyl groups, and R is selected from the class consisting of hydrogen and the groups corresponding to R'.

2. The process of making an unsaturated nitrile-cellulose product which is soluble in dilute aqueous alkali solutions, which consists in allowing cellulose to react with a 30% to 40% aqueous solution of sodium hydroxide until soda cellulose is formed, adding thereto a beta-substituted alpha-beta-unsaturated nitrile in amount from about 5% to 100% of the cellulose and permitting same to react at between ice temperature and below boiling temperature until a nitrile-cellulose compound is formed, acidifying the reaction mixture and recovering the reaction product by filtering, washing and drying same; the unsaturated nitrile having the formula

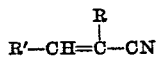

where R' is selected from the class consisting of alkyl, aryl, alkaryl, aralkyl, olefinyl, alkynyl, cyano carboxy, keto, aldehydo, carbalkoxy and acyl groups, and R is selected from the class consisting of hydrogen and the groups corresponding to R'.

3. The process of making an unsaturated nitrile-cellulose product which is soluble in dilute aqueous alkali solutions, which consists in reacting crotononitrile and alkali cellulose, acidifying the reaction mixture and recovering the reaction product by filtering, washing and drying the same.

4. The process of making an unsaturated nitrile-cellulose product which is soluble in dilute aqueous alkali solutions, which consists in reacting cinnamonitrile and alkali cellulose, acidifying the reaction mixture and recovering the reaction product by filtering, washing and drying the same.

5. The process of making an unsaturated nitrile-cellulose product which is soluble in dilute aqueous alkali solutions, which consists in reacting beta-propylacrylonitrile and alkali cellulose, acidifying the reaction mixture and recovering the reaction product by filtering, washing and drying the same.

6. A nitrile-cellulose product soluble in dilute aqueous alkali solutions consisting of the acid-coagulated, washed and dried reaction product of a beta-substituted alpha-beta-unsaturated nitrile and alkali cellulose; the unsaturated nitrile having the formula

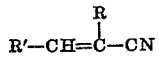

where R' is selected from the class consisting of alkyl, aryl, alkaryl, aralkyl, olefinyl, alkynyl, cyano, carboxy, keto, aldehydo, carbalkoxy and acyl groups, and R is selected from the class consisting of hydrogen and the groups corresponding to R'.

7. A nitrile-cellulose product soluble in dilute aqueous alkali solutions, consisting of the acid-coagulated, washed and dried reaction product of a beta-substituted alpha-beta-unsaturated nitrile and a soda cellulose, the soda cellulose being prepared with a 30% to about 40% aqueous sodium hydroxide solution with the amount of sodium hydroxide equal to from 3 to about 8 moles NaOH per $C_6H_{10}O_5$ group of cellulose, and the amount of unsaturated nitrile being from 5% to about 100% of the cellulose; the unsaturated nitrile having the formula

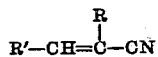

where R' is selected from the class consisting of alkyl, aryl, alkaryl, aralkyl, olefinyl, alkynyl, cyano, carboxy, keto, aldehydo, carbalkoxy and acyl groups, and R is selected from the class consisting of hydrogen and the groups corresponding to R'.

8. A nitrile-cellulose product soluble in dilute aqueous alkali solutions, consisting of the acid-coagulated, washed and dried reaction product of crotononitrile and alkali cellulose.

9. A nitrile-cellulose product soluble in dilute aqueous alkali solutions, consisting of the acid-coagulated, washed and dried reaction product of cinnamonitrile and alkali cellulose.

10. A nitrile-cellulose product soluble in dilute aqueous alkali solutions, consisting of the acid-coagulated, washed and dried reaction product of beta-propylacrylonitrile and alkali cellulose.

11. A solution of the nitrile-cellulose product of claim 6 in dilute aqueous sodium hydroxide solution.

JOHN B. RUST.